(12) United States Patent
Becker

(10) Patent No.: US 8,458,987 B2
(45) Date of Patent: Jun. 11, 2013

(54) INSULATING PLATE/STUDDED PLATE WITH ADHESIVE ABSORBENT QUALITIES

(75) Inventor: Björn Eduardo Becker, Gamleby (SE)

(73) Assignee: Isola AS, Notodden (NO)

( * ) Notice: Subject to any disclaimer, the term of this patent is extended or adjusted under 35 U.S.C. 154(b) by 351 days.

(21) Appl. No.: 12/811,927

(22) PCT Filed: Jan. 5, 2009

(86) PCT No.: PCT/NO2009/000002
§ 371 (c)(1),
(2), (4) Date: Jul. 28, 2010

(87) PCT Pub. No.: WO2009/088298
PCT Pub. Date: Jul. 16, 2009

(65) Prior Publication Data
US 2010/0319286 A1 Dec. 23, 2010

(30) Foreign Application Priority Data
Jan. 8, 2008 (NO) .................................. 20080116

(51) Int. Cl.
*E04B 1/00* (2006.01)
*E04G 21/00* (2006.01)
*E04G 23/00* (2006.01)

(52) U.S. Cl.
USPC ............ 52/746.1; 52/302.3; 52/408; 52/385; 52/747.11; 52/309.5; 52/480; 52/450; 52/403.1; 52/413; 428/156; 428/172

(58) Field of Classification Search
USPC ............ 52/309.5, 302.1, 385, 386, 390, 391, 52/449, 746.1, 747.11, 177, 480, 450, 403.1, 52/311.1, 169.14, 413, 302.3, 408; 428/212, 428/156, 172; 405/36, 43, 50
See application file for complete search history.

(56) References Cited

U.S. PATENT DOCUMENTS

| | | | | | |
|---|---|---|---|---|---|
| 1,277,622 | A | * | 9/1918 | Madison | 52/408 |
| 3,931,429 | A | * | 1/1976 | Austin | 428/158 |
| 4,917,933 | A | * | 4/1990 | Schluter | 428/99 |
| 6,434,901 | B1 | * | 8/2002 | Schluter | 52/302.1 |
| 6,691,472 | B2 | * | 2/2004 | Hubert | 52/169.5 |
| 6,878,433 | B2 | * | 4/2005 | Curro et al. | 428/198 |
| 6,984,429 | B2 | * | 1/2006 | Thunhorst et al. | 428/41.8 |

(Continued)

FOREIGN PATENT DOCUMENTS

| | | |
|---|---|---|
| EP | 1700970 A2 | 9/2006 |
| EP | 1760223 A1 | 3/2007 |
| JP | 07090951 | 4/1995 |
| NO | 141379 | 2/1977 |
| WO | WO 99/55985 | 11/1999 |

OTHER PUBLICATIONS

Norwegian Search Report corresponding to Norway 20080116, mailing date Jul. 2, 2008, 1 page.

(Continued)

*Primary Examiner* — Joshua J Michener
*Assistant Examiner* — Chi Q Nguyen
(74) *Attorney, Agent, or Firm* — Myers Bigel Sibley & Sajovec, PA

(57) ABSTRACT

A studded plate (1) of layer (2) of a polymeric material where an adhesive material (3,4) in the form of a woven or non-woven material is attached on each side of the layer (2).

18 Claims, 1 Drawing Sheet

U.S. PATENT DOCUMENTS

| | | | |
|---|---|---|---|
| 7,037,569 B2 * | 5/2006 | Curro et al. | 428/138 |
| 7,132,151 B2 * | 11/2006 | Rasmussen | 428/182 |
| 7,536,835 B2 * | 5/2009 | Schluter | 52/390 |
| 7,585,556 B2 * | 9/2009 | Julton | 428/156 |
| 7,820,271 B2 * | 10/2010 | Rasmussen | 428/182 |
| 7,877,938 B2 * | 2/2011 | Bennett et al. | 52/177 |
| 8,007,886 B2 * | 8/2011 | Tierney et al. | 428/40.1 |
| 8,112,950 B2 * | 2/2012 | Bennett et al. | 52/177 |
| 8,132,377 B2 * | 3/2012 | Julton | 52/302.1 |

OTHER PUBLICATIONS

Notification of Transmittal of International Preliminary Report on Patentability corresponding to PCT/NO2009/000002, mailing date Dec. 8, 2009, 7 pages.

* cited by examiner

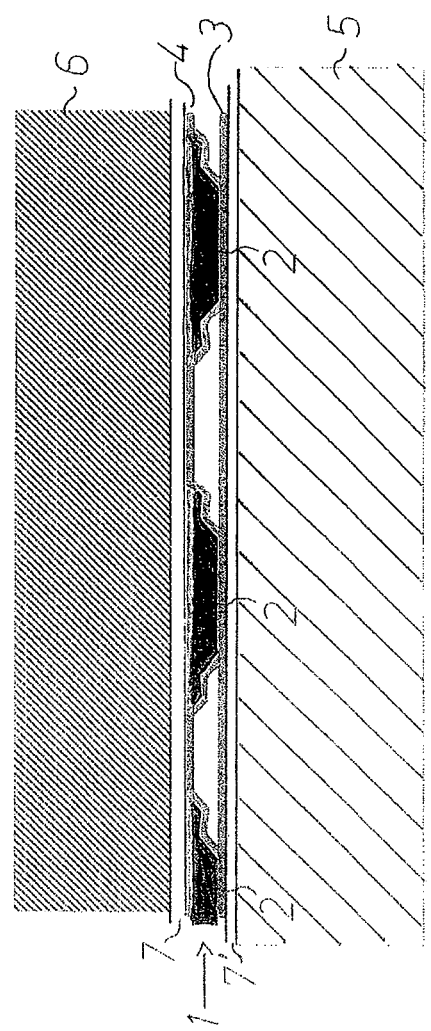

INSULATING PLATE/STUDDED PLATE WITH ADHESIVE ABSORBENT QUALITIES

RELATED APPLICATIONS

The present application is a 35 U.S.C. §371 national phase application of PCT International Application No. PCT/NO2009/000002, filed Jan. 5, 2009, which claims priority from Norwegian Patent Application No. 20080116, filed Jan. 8, 2008, the disclosures of which are hereby incorporated herein by reference in their entireties. The above PCT International Application was published in the English language and has International Publication No. WO 2009/088298.

BACKGROUND FOR THE INVENTION

The present invention relates to floor covering with a wooden floor on a substrate, e.g. of concrete or screed or planing mass. The invention also relates to a method for covering such substrate with a floor covering and the use of a studded plate for such floors.

In one aspect, the present invention, as mentioned above, relates to a special type of an insulating plate/studded plate with adhesive absorbent qualities, alternatively sound absorbent or energy reflecting/energy transforming qualities, where layers of an absorbent material, such as felt or a felt-like woven or non-woven material are applied on each side of a basic layer of an impenetrable or leakproof plate material of a synthetic material such as a plastic material, hvere the synthetic material comprises a number of bulges, such as bulges in the shape of studs, where a layer of an adhesive absorbent material is applied to each side of the basic layer in such a way that the layer of adhesive absorbent material is tightly connected to the outermost surface area of bulges or studs, alternatively to the outermost surface area of the plate material between the bulges or studs on the opposite side in relation to the bulges or studs.

It is known to use studded plates as support plates where they can be used as ordinary support plates, draining plates, disconnecting plates or plaster plates or as a support for adhesive means for tiles, e.g floors covered with ceramis tiles. Examples of this can be found in US Patent Application 2006/0201092 and European Patent Application EP 1 700 970 A2.

A number of buildings of today are made of concrete or a concrete based material, especially in constructions verging soil, where the contrete mass and the hardened concrete lies in direct contact with surrounding earth, stone, clay or rock material and where these conditions causes the concrete to harden slowly and/or time consuming. If the surrounding mass is contains large amounts of moisture, e.g. after heavy rain or flooding, the concrete will be feeded with further moisture. Therefore, the concrete can excrete moisture over a long time span.

The use of a plastic sheet and polystyrene or mineral wool based insulating material gives some, but not sufficient protection against moisture from the ground, but the floor materials are sensitive towards moisture in the concrete. Due to this moisture, it is not advantageous to arrange a floor material, such as parquet or other wooden flooring directly on such concrete. It is therefore necessary to use a membrane material between the concrete and the flooring to avoid e.g. rotting, moisture penetration, obliquity or dislocation of the framing strips or parquet blocks, a general weakening of the floor material etc. To this end, it is in many cases used studded plate that provide a gap in the form of channels between the concrete and the floor covering. The bulges or studs in such studded plates can be shaped in many ways, such as four-sided, rounded, polygonal etc and can be with or without overhang or projections.

All concrete floors being put directly on the soil, contans humidity. Accordingly, floor coverings such as wooden floors cannot be put directly on the concrete. Cement/concrete/reinforced concrete being used in floors above soil will also contain humidity, compricing e.g. floors made of a slightly expanding clay aggregate concrete and light weight concrete, plaster based floors/walls/ceiling, concrete modules applied with floating floors, floating floors of laminated products or parquet, floors applied with plaster/clay based screed coat ets. The moisture in concrete elements and/or other concrete is often invisible and hard to detect and without a membrane and ventilating possibilities between the concrete and the floor covering, there will, over time, be a risk of attacks from rot, humidity damages etc. Without an efficient impermeable membrane being sufficiently efficient, moisture from the concrete can attack the wooden materials from below. The same problem can also be seen on tiled floors where the filled seams will allow passage of moisture. The result is damaged floors with swelling, fungus and rot. In addition, there can arise bad smell, harmful fungus spores and a poor indoor environment.

In general, all floor constructions being based on concrete/cementhas the quality that the use water for hardening. The moisture in, the concrete is often invisible and hard to detect. To obtain a good moiture/sound and temperature insulation, also in floor provided with heat sources, it is advantageous to use a number of isolation layers between a laminate floor, parquet floor or floor of a synthetic material. In new buildings, it takes time to desiccate or dry moisture out of the concrete floor construction. The waiting time for drying such concrete floors can range up to a year and often will surveillance of the moisture represent increased costs such as when wooden floors are arranged in a traditional manner.

Studded plates are used to prevent problems relating to moisture in floors. To solve such problems as indicated above, a "passive" ventilating is being used. The studded plates often contains hollow studes with round or rounded, four-sided or with other cross sections of the perimeter or circumference of the studs, with a diameter of from 5 to 55 mm and a height from 1 to 10 mm, or even 20 mm. The studs are often distributed in a quadrangular pattern or an altering pattern to give a sufficient apportionmant of the load as well as the ventilation. The studs can advantageously be dispersed over the plate with the tops or peaks of the studs facing downwards towards the base flooring or sleeper to form an air gap on the underside of the plate between the studs. An opposite placement can also be used and it is possible to form plates where the studs are facing towards both sides of the plate.

The plates can be joined by a sealing tape of the upper side of the plates to obtain a sealed floor space. In the case of severe problems with humidity, smell and other emissions, the air gap between the studded plates and base layer can be ventilated mechanically to provide an air stream over the concrete surface or substrate and form a negative pressure in relation to the space or room above the plates. A ventilated air gap can also contribute to the drying of the concrete.

It is furthermore known to use studded plates as a membrane between a concrete substrate and tiles lied on such substrate. The concrete substrate is covered with studded plates. The studded plates can thereafter be covered with a binding adhesive on which the tiles are arranged.

However, wooden floors are also used instead of tiles in everyday rooms etc. Some wooden floors are lied "floating" without binding to the substrate. Other floors have to be anchored. It is therefore a need to find a method for covering a subrate where the humidity from the concrete base is not affecting the wooden floor being attached to the substrate.

Different types of primer of adhesive are normally used to attach wooden floors to concrete substrates. However, it is found that this can result in problems, especially relating to the remaining moisture in the concrete, as explained above.

SUMMARY

The object of the invention is therefore to present a method for covering a substrate with a floor covering of wood being attached to the substrate, where the wooden floor or parquet or laminate is not in contact with or affected by the humidity in the underlying concrete floor.

This is done by covering the substrate with an adhesive that can be a one, two or multiple component adhesive based on cement, polymers, polyurethane, epoxy or other.

A studded plate is laid on the adhesive layer. The studded plates are laid in the ahesive layer with adjoining plate edges edge towards edge or with flate overlapping edges well over the preceding plate. The joints in the plates can thereafter be sealed by using a suitable sealing tape.

The studded plates according to the invention can in one embodiment be used as a processed product where the felt or felt like layer on one or each side of the studded plate is applied with an adhesive in advance. In such embodiemnt, it is advantageous that the adhesive layer is covered with a covering/release paper/foil, which thereafter is teared off at the laying of the floor constrution. Combinations of adhesive and covering/release paper/foil where there is a small tackiness between the adhesive and the relase foil is known for the skilled person.

The studded plate has a material such as a felt or a felt-like woven or non-woven material laminated, adhered or melted to at least the protruding part of the studs facing the underlying substrate surface, in such a way that the material will adhere to the substrate surface. The material is preferably of a low permeability preventing filling up of the air gap between the studs.

The studded plates are covered with an adhesive on which parquet blocks or other types of wooden floors can be adhered. The adhesive is laid on the layer material on the side of the studded plates facing upwards when mounted on a floor substrate , the layer material being felt or a felt-like woven or non-woven material, in such a way that the inside of the studs facing upwards when mounted on a floor substrate cannot be filled with the adhesive, the adhesive will only penetrate the felt material on the side facing upwards. The wooden floor, parquet or parquet blocks can thereafter be arranged on and adhered to the adhesive.

A gap is left between the edge of the floor and the surrounding walls. Humidity from the substrate can easily escape from the floor and along the edges in the gap. A skirting board is arranged on the lower part of the wall in such a way that it covers the edge of the flooring. The skirting board can be arranged in such a way that a clearance is made between the wall surface and the surface of the skirting board facing the wall. In this way, humidity from the substrate will have a free passage through the gap between the flooring and the walls and can disperse into the room.

It is also possible to provide a studded plate with a folding line adjacent to the wall in such a way that the studded plate covers the lower part of the walls surrounding the floor substrate. Such an arrangement is described in patent application EP 05 008 263.5. The floor will mainly be made as described, but without leaving a gap between the ahesive layers and the adjacent walls. Thereby, the gap can be made by the studded plate with a folding line.

The method according to the invention provides a floor being well protected agaisn underlying humidity and tolerating changes in the surrounding air humidity in the room.

It is previously known from e.g. patent application 05 111 6589.9 and Norwegian Patent no. 177 940 to provide a floor composition with a studded plate where there are channels between the studs and where a coating is laid as a layer over the plates.

Resembling types of studded plates with an associated layer where an impermeable base layer is applied with a porous or woven or non-woven layer in the form of a plane substrate being attached to the top of each stud or a number of such studs is likewise commersially known. In patent application EP 05 111 6589.9, the plane layer of porous, woven or non-woven material is meant as an adhesive absorbent layer so that the plate is connected to the substrate by an adhesive layer, while the parquet is anchored in adhesive having a mechanical grip in the studs.

To improve the above mentioned sound absorbing layers, such alyers are applied with a partly free moving sound absorbing material. Polyethylene foil (PE foil) applied with foam is known as a sound absorbing product in floor constructions. Studded plates with an adhesively applied foam layer of the previously known type is also known the provide sound and/or heat isolating qualities.

There are studded plates with felt or felt-like woven or non-woven material applied to the underside in the form of a plane substrate, e.g. from patent application EP 05 111 6589.9 or U.S. Pat. No. 6,434,901. In these cases, the felt has adhesive absorbent and binding functions.

The present invention relates to an insulating plate/studded plate with adhesive absorbent features, alternatively sound absorbing or energy reflecting/transforming features, where a layer of an adhesive absorbent material, such as a felt or a felt-like woven or non-woven material is applied on both sides of a basic layer of an impenetrable plate material of a synthetic material such as a plastic material, where the synthetic material comprises a number of bulges, such as bulges in the shape of studs, where the adhesive absorbent layer material being applied on both sides of the basic layer is tightly connected to the basic layer in the uppermost parts of the studs or to the plate material on the opposite side in relation to the bulges or studs. In a preferred embodiment, the adhesive absorbent layer material is applied to every point of the uppermost part of the studs or to every point of the plate material on the opposite side of the plate in relation to the studs.

BRIEF DESCRIPTION OF THE DRAWING

The composition of the layers is shown in cross section in the attached drawing.

DETAILED DESCRIPTION OF EMBODIMENTS OF THE INVENTION

The present invention thereby relates to an insulating plate/ studded plate with moisture protecting qualities, alternatively sound absorbing and/or energy reflecting/transforming qualities where a layer of an adhesive absorbent material such as felt or a felt-like woven or non-woven material or a foamed material, where the material comprises open and/or closed cells or pores, is applied on both sides of a basic layer of an impenetrable or leakproof material of a synthetic material such as a plastic material, where the synthetic material comprises a number of bulges such as bulges in the shape of studs, where the adhesive absorbent layer material is applied on the basic layer so that the layer material is tightly connected to the basic layer on every spot of the studs and to every spot of the plate material on the opposite side in relation to the bulges or studs.

Furthermore, the invention relates to the use of such plate in a floor construction as a moisture or humidity protecting and/or sound isolating/energy transforming layer.

Examples of constructions where plates according the present invention can be used, are shown in the attached FIGURE.

The attached drawing shows in cross section a construction of a parquett floor where a studded plate 1, comprising a layer of a synthetic polymeric material 2 (PE, polyethylene or PP, polypropylene) with a lower layer of felt 3 and an upper layer of felt 4 are applied to a substrate (concrete) 5 and floor layer 6 by means of an adhesive 7,7', such as a parguet glue. The layer of synthetic polymeric material can also comprise or be made of other polymeric materials than PE or polypropylene (PP), such as polyethylene terephthalate (PET), polybutene terephthalate (PBT), polystyrene (PS), polyterephthalate (PTF), polyurethane (PU), types of polypolyvinyl, acryl-butadiene-styrene, and the polymeric material can also comprise copolymers to adjust the stiffness of the plates to the special purpose. The stiffness of the plates will be adapted to needs relating to transport and/or absorbtion/reflection for the specific floor covering and can easily be determined by the skilled person.

Specifically can the studded plates according to the invention be used as a humidity and sound isolating and adhesive/binding layer when laying bonded floors. The studded plates according to the invention can also be made with different types of stud forming and folding lines and/or areas, such as known from prior art in relation to conventional studded plates. The studs of the studded plates according to the invention can be shaped in many ways, such as quadrangular, round or rounded, polygonal etc. and with or without overhang. It is also possible to provide studded plates with an undulated pattern in cross section, e.g. sinus waves.

The invention claimed is:

1. A studded plate positioned in a floor construction including a substrate and an adhesive material thereon, the studded plate comprising:
    a layer of synthetic/polymeric material, the layer of synthetic/polymeric material having a plurality of bulges, the plurality of bulges forming a plurality of raised areas on a first side of the layer of synthetic/polymeric material, each of the raised areas defined by an uppermost portion of one of the bulges, the layer of synthetic/polymeric material further comprising a lowered area between the bulges on a second, opposing side of the layer of synthetic/polymeric material;
    a first layer of absorbent woven or non-woven material having first and second opposed sides, the first side of the first layer of absorbent woven or non-woven material connected to the first side of the layer of synthetic/polymeric material in an even thickness, wherein the first layer of absorbent woven or non-woven material is connected to the plurality of raised areas of the first side of the layer of synthetic/polymeric material; and
    a second layer of absorbent woven or non-woven material having first and second opposed sides, the first side of the second layer of absorbent woven or non-woven material connected to the second side of the layer of synthetic/polymeric material in an even thickness, wherein the second layer of absorbent woven or non-woven material is connected to the lowered area of the second side of the layer of synthetic/polymeric material;
    wherein the first and second layers of absorbent woven or non-woven material are adapted such that, when the second side of a respective one of the first and second layers of absorbent woven or non-woven material is secured to the adhesive material on the substrate, the adhesive material only partially penetrates the respective one of the first and second layers of absorbent woven or non-woven material.

2. A studded plate according to claim 1, wherein the first layer of absorbent woven or non-woven material is connected to every spot or a whole surface of the raised areas of the first side of the layer of synthetic/polymeric material, and wherein the second layer of absorbent woven or non-woven material is connected to every spot or a whole surface of the lowered area of the second opposing side of the layer of synthetic/polymeric material.

3. A studded plate according to claim 1, wherein the bulges comprise studs in the layer of synthetic/polymeric material.

4. A studded plate according to claim 1, wherein each of the first and second layers of absorbent woven or non-woven material comprises a felt or a felt-like material.

5. A studded plate according to claim 4, wherein the first side of at least one of the first and second layers of absorbent woven or non-woven material comprises an adhesive, and wherein the at least one of the first and second layers of absorbent woven or non-woven material is adhered to the layer of synthetic/polymeric material using the adhesive.

6. A studded plate according to claim 1, wherein the layer of synthetic/polymeric material comprises polyethylene (PE) or polypropylene (PP).

7. The studded plate according to claim 1, wherein each of the bulges has an inside extending upwardly from the second side of the layer of synthetic/polymeric material, and wherein the first and second layers of absorbent woven or non-woven material are adapted such that, when the second side of a respective one of the first and second layers of absorbent woven or non-woven material is secured to the adhesive material on the substrate, the adhesive material does not enter the insides of the bulges.

8. A method for covering a substrate with a floor covering of a wooden material wherein the floor covering is not in contact with the substrate, the method comprising:
    covering the substrate with an adhesive material, and
    laying at least one studded plate on the adhesive material, the at least one studded plate comprising:
        a layer of synthetic/polymeric material, the layer having a number of bulges forming raised areas on a first side of the layer of synthetic/polymeric material and lowered areas on a second, opposing side of the layer of synthetic/polymeric material, and
        first and second layers of absorbent woven or non-woven material, the first layer of absorbent woven or non-woven material connected to the raised areas on the first side of the layer of synthetic/polymeric material and the second layer of absorbent woven or non-woven material connected to the lowered areas on the second side of the layer of synthetic/polymeric material,
    wherein laying the at least one studded late on the adhesive material comprises laying a respective one of the first and the second layers of absorbent woven or non-woven material on the adhesive material, wherein the adhesive material only partially penetrates the respective one of the first and second layers of absorbent woven or non-woven material.

9. A method according to claim 8, wherein the at least one studded plate is a pre-formed plate.

10. A method according to claim 8, wherein the at least one studded plate comprises a plurality of studded plates, and wherein the laying step comprises laying a studded plate on the adhesive material with an edge of the studded plate adjoining an edge of a preceding studded plate or a flat edge of the studded plate overlapping a flat edge of a preceding studded plate, the method further comprising sealing joints of the studded plate and the preceding studded plate after the laying step.

11. The method according to claim 8, wherein each of the first and second layers of absorbent woven or non-woven material has first and second opposing sides, wherein the first side of each of the first and second layers of absorbent woven or non-woven material comprises an adhesive, the method further comprising:
  prior to laying the at least one studded plate on the adhesive material, forming the studded plate including:
    adhering the first side of the first layer of absorbent woven or non-woven to the first side of the layer of synthetic/polymeric material using the adhesive; and
    adhering the first side of the second layer of absorbent woven or non-woven to the second side of the layer of synthetic/polymeric material using the adhesive.

12. The method according to claim 11, wherein each respective first and second layer of absorbent woven or non-woven material includes a releasable cover overlying the adhesive on the first side of the respective layer of absorbent woven or non-woven material, the method further comprising, prior to forming the studded plate:
  removing the cover on the first side of each of the first and second layers of absorbent woven or non-woven material.

13. A method according to claim 8, wherein the adhesive material is a 1 or 2 component adhesive based on one or two of the following components: cement, polymer, polyurethane, and epoxy.

14. A floor construction comprising:
  a wooden floor layer;
  a concrete substrate;
  an adhesive material on the concrete substrate; and
  a studded plate positioned between the wooden floor layer and the concrete substrate, the studded plate comprising:
    a layer of synthetic/polymeric material, the layer of synthetic/polymeric material having a number of bulges forming raised areas on a first side of the layer of synthetic/polymeric material and lowered areas on a second, opposing side of the layer of synthetic/polymeric material; and
    first and second layers of absorbent woven or non-woven material, the first layer of absorbent woven or non-woven material connected to the first side of the layer of synthetic/polymeric material and the second layer of absorbent woven or non-woven material connected to the second side of the layer of synthetic/polymeric material;
  wherein a respective one of the first and second layers of absorbent woven or non-woven material is positioned on the adhesive material, and wherein the adhesive material only partially penetrates the respective one of the first and second layers of absorbent woven or non-woven material;
  wherein the studded plate is adhered to an underside of the wooden floor layer.

15. The floor construction according to claim 14, wherein the wooden floor layer is made of wood, chip or parquet laminate.

16. The floor construction according to claim 14, wherein the studded plate is adhered to the concrete substrate.

17. The floor construction according to claim 14, wherein each of the raised areas are defined by an uppermost portion of one of the bulges on the first side of the layer of synthetic/polymeric material, and wherein the lowered areas are defined between the bulges on the second side of the layer of synthetic/polymeric material.

18. The floor construction according to claim 17, wherein the first layer of absorbent woven or non-woven material is connected to every spot or a whole surface of the raised areas of the first side of the layer of synthetic/polymeric material, and wherein the second layer of absorbent woven or non-woven material is connected to every spot or a whole surface of the lowered areas of the second opposing side of the layer of synthetic/polymeric material.

* * * * *

UNITED STATES PATENT AND TRADEMARK OFFICE
CERTIFICATE OF CORRECTION

PATENT NO.        : 8,458,987 B2                              Page 1 of 1
APPLICATION NO.   : 12/811927
DATED             : June 11, 2013
INVENTOR(S)       : Becker It is certified that error appears in the above-identified patent and that said Letters Patent is hereby corrected as shown below:

In the Claims:
Column 6, Claim 8, Line 64: Please correct "studded late on"
to read -- studded plate on --

Signed and Sealed this
Twenty-sixth Day of November, 2013

Margaret A. Focarino
*Commissioner for Patents of the United States Patent and Trademark Office*